US010624280B2

(12) United States Patent
Eyring et al.

(10) Patent No.: US 10,624,280 B2
(45) Date of Patent: Apr. 21, 2020

(54) METHOD AND SYSTEM FOR MANAGING AN IRRIGATION SCHEDULE

(71) Applicant: Vivint, Inc., Provo, UT (US)

(72) Inventors: Matthew J. Eyring, Provo, UT (US); Jeremy B. Warren, Draper, UT (US); James E. Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 524 days.

(21) Appl. No.: 14/924,501

(22) Filed: Oct. 27, 2015

(65) Prior Publication Data

US 2017/0112079 A1 Apr. 27, 2017

(51) Int. Cl.
*A01G 25/16* (2006.01)

(52) U.S. Cl.
CPC .................... *A01G 25/165* (2013.01)

(58) Field of Classification Search
CPC ...................................................... A01G 25/165
See application file for complete search history.

(56) References Cited

U.S. PATENT DOCUMENTS

| 8,712,592 | B2 * | 4/2014 | Carlson | A01G 25/167 239/69 |
| 2005/0088523 | A1 * | 4/2005 | Wu | H04N 7/18 348/152 |
| 2007/0115164 | A1 * | 5/2007 | Wu | G08B 29/183 342/28 |
| 2009/0007706 | A1 | 1/2009 | Hitt et al. | |
| 2010/0145530 | A1 * | 6/2010 | Nickerson | A01G 25/16 700/284 |
| 2010/0179701 | A1 | 7/2010 | Gilbert et al. | |
| 2010/0268562 | A1 | 10/2010 | Anderson | |
| 2011/0270448 | A1 * | 11/2011 | Kantor | A01G 25/165 700/284 |
| 2012/0273704 | A1 | 11/2012 | O'Connor | |
| 2012/0286062 | A1 * | 11/2012 | Sicotte | A62C 37/00 239/71 |
| 2015/0005960 | A1 | 1/2015 | Endrizzi | |
| 2015/0005962 | A1 * | 1/2015 | Endrizzi | A01G 25/165 700/284 |
| 2015/0223416 | A1 * | 8/2015 | Eng | G05B 15/02 700/284 |
| 2016/0248847 | A1 * | 8/2016 | Saxena | H04L 67/18 |

* cited by examiner

*Primary Examiner* — Jason Lin
(74) *Attorney, Agent, or Firm* — Holland & Hart, LLP

(57) ABSTRACT

A method for managing an irrigation schedule is described. Data related to soil at a location may be received from a first sensor by way of a first wireless communication. Data related to weather at the location may be received from a second sensor by way of a second wireless communication. At least one video frame of the location may be received from a camera located within a predetermined distance from the location by way of a third wireless communication. An amount of liquid to discharge at the location may be determined based at least in part on the received data and the received video frame. A discharge of the determined amount of liquid at the location may be activated.

18 Claims, 7 Drawing Sheets

METHOD AND SYSTEM FOR MANAGING AN IRRIGATION SCHEDULE

BACKGROUND

The present disclosure relates to security and/or automation systems, and more particularly to an automated irrigation schedule.

Security and automation systems are widely deployed to provide various types of communication and functional features such as monitoring, communication, notification, and/or others. These systems may be capable of supporting communication with a user and/or other systems through a communication connection or a system management action.

Current irrigation systems may be programmed by a user to water a yard on certain days and at certain times; however, current systems may not take into account a plurality of irrigation related data which makes for more efficient and water- and energy-saving irrigation. In addition, once programmed, the irrigation system does not take into account the change of schedule of a home's occupants; for example, whether someone is in the yard when the watering starts. Thus, an irrigation system is needed which takes into account a plurality of location specific data.

SUMMARY

In one embodiment, data related to soil at a location may be received from a first sensor by way of a first wireless communication. Data related to weather at the location may be received from a second sensor by way of a second wireless communication. At least one video frame of the location may be received from a camera located within a predetermined distance from the location by way of a third wireless communication. An amount of liquid to discharge at the location may be determined. The determined amount of liquid may be based at least in part on the received data and the received video frame. A discharge of the determined amount of liquid at the location may be activated.

In one example, the first sensor and the second sensor may be the same sensor. The first wireless communication, the second wireless communication, and the third wireless communication may be the same wireless communication. In one embodiment, at least one real-time video frame of the location may be received from the camera. The at least one video frame received from the camera may be stored on a storage device.

In one example, an indication of an irrigation schedule may be received from a user based on the received data and the received video frame. The indication may be received prior to determining the amount of liquid to discharge.

In one embodiment, movement information associated with the location may be received from a motion sensor. A first indication of the movement information may be identified. A time frame between the first indication of the movement and a second indication of the movement may be calculated. If the time frame is less than a predetermined threshold, a predetermined amount of liquid may be discharged at the location.

The amount of liquid determined to be discharged may be based on receiving an indication of a user-selected amount of liquid. In one example, weather data associated with the location may be obtained by way of a wireless communication network. The data and the video frame may be received on a remote portable electronic device. The received data related to soil at the location may include at least one selected from the group comprising: soil moisture, soil type, soil composition, incline of the soil at the location, air humidity at the location, air temperature at the location, and soil temperature at the location.

In one example, an apparatus for managing an irrigation schedule is described. The apparatus may include a processor and a memory in electronic communication with the processor. Instructions are stored in the memory, the instructions being executable by the processor to receive, from a sensor by way of a wireless communication, data related to soil at a location, receive, from a camera located within a predetermined distance from the location by way of the wireless communication, at least one video frame of the location, determine an amount of liquid to discharge at the location based at least in part on the received data and the received video frame, and activate a discharge of the determined amount of liquid at the location.

In one example, a non-transitory computer-readable medium is described. The non-transitory computer readable medium stores computer-executable code that is executable by a processor to receive, from a sensor by way of a wireless communication, data related to soil at a location, receive, from a camera located within a predetermined distance from the location by way of the wireless communication, at least one video frame of the location, determine an amount of liquid to discharge at the location based at least in part on the received data and the received video frame, and activate a discharge of the determined amount of liquid at the location.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

In many residential and business locations, landscaping is maintained by way of automated irrigation systems. In addition, agricultural land may be similarly irrigated on an automated system. However, these systems do not take into account the condition of the land (e.g., current soil moisture at the time of irrigation), current weather considerations (e.g., if there is rain or if rain is expected, whether the temperature may dip below freezing), and city-controlled watering restrictions, nor do the current systems take into account the presence of people, pets, or livestock in an area where irrigation occurs. Thus, an intelligent system which enables a user to set an irrigation schedule considering a plurality of elements which may affect landscaping and/or agriculture is needed.

The following relates generally to automation and/or security systems. Automation systems may include one or more sensors located outside and/or inside a premises. A premises such as a home or business may employ automation and/or security systems to automate and secure an area of the premises.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
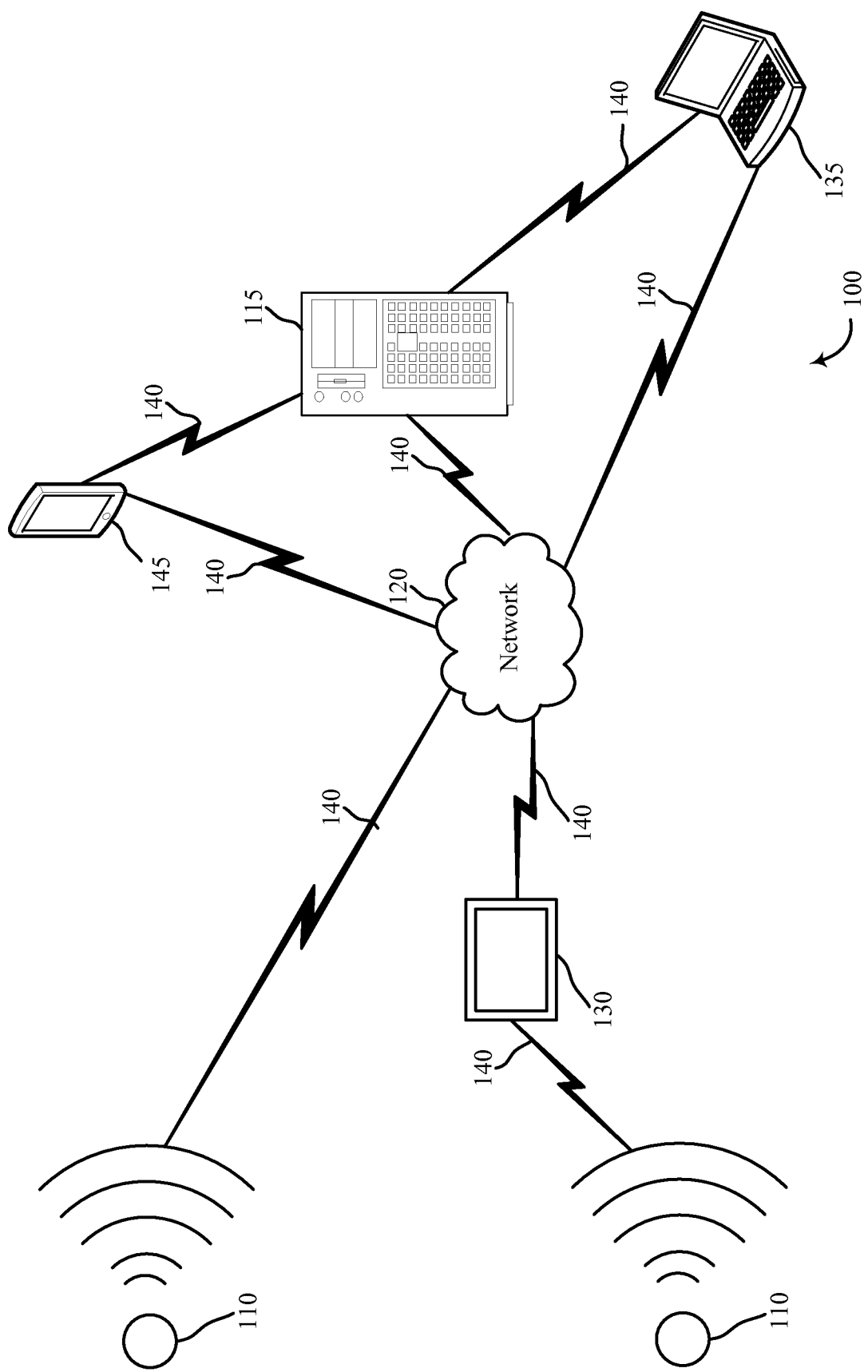
FIG. 1 shows a block diagram relating to managing an irrigation system, in accordance with various aspects of this disclosure.

FIG. 1 shows a block diagram of an example automation system 100 in accordance with various aspects of the disclosure. The automation system may include one or more sensors 110, network 120, server 115, control panel 130, and computing devices 135, 145. The network 120 may provide user authentication, encryption, access authorization, tracking, Internet Protocol (IP) connectivity, and other access, calculation, modification, and/or functions. The control panel 130 may interface with the network 120 through a first set of wired and/or wireless communication links 140 to communicate with one or more servers 115. The control panel 130 may perform communication configuration, adjustment, and/or scheduling for communication with the devices 135 and 145, or may operate under the control of a controller.

The control panel 130 may wirelessly communicate with the devices 135 and 145 by way of one or more antennas. The control panel 130 may provide communication coverage for a respective geographic coverage area. The geographic coverage area for the control panel 130 may be divided into sectors making up only a portion of the coverage area. The communication system, therefore, may comprise more than one control panel 130, where each control panel 130 may provide geographic coverage for a sector of the coverage area. The automation system 100 may include one or more control panels 130 of different types. The control panel 130 may be related to one or more discrete area. For example, each control panel 130 may be related to one or more discrete structures (e.g., a home, a business) and each of the one more discrete structures may be related to one or more discrete areas. In other examples, control panel 130 may be related to the same one or more discrete structures (e.g., multiple control panels relating to a home and/or a business complex).

In some examples, control panel 130 may be referred to as a control device, a base transceiver station, a radio base station, an access point, a radio transceiver, or some other suitable terminology. Control panel 130 may be a home automation system control panel or a security control panel, for example, an interactive panel located in a user's home. In one embodiment, the control panel 130 may comprise a speaker, a microphone, and/or a camera. The control panel 130 may operate to broadcast audio and/or video communications from devices 135 and/or 145. In other embodiments, control panel 130 receives input in the form of audio input, video input, biometric data, geographic data (e.g. geotagging, global positioning data), and the like.

Control panel 130 may be in direct communication via wired or wireless communication links 140 with the one or more sensors 110, or may receive sensor data from the one or more sensors 110 via local computing device 145 and network 120, or may receive data via remote computing device 135, server 115, and network 120.

The control panel 130 may wirelessly communicate with the sensors 110 by way of one or more antennas. The sensors 110 may be stationary and/or mobile, and may be located in a plurality of locations both inside and outside of the home. A sensor 110 may include and/or be one or more sensors that sense: proximity, motion, temperatures, humidity, moisture, weather, slope/incline, soil type, water type, soil density, sound level, time, amount of light, pressure, geo-location data of a user and/or a device, distance, biometrics, weight, speed, height, size, preferences, system performance, and/or other inputs that relate to a security and/or an automation system. Control panel 130, devices 135 and 145, and/or a sensor 110 may be able to communicate through one or more wired and/or wireless connections with various components such as base stations, and/or network equipment (e.g., servers, wireless communication points).

The communication links 140 shown in automation system 100 may include uplink (UL) transmissions from a device 135 or 145 to control panel 130, and/or downlink (DL) transmissions from control panel 130 to a device 135 or 145. The downlink transmissions may also be called forward link transmissions while the uplink transmissions may also be called reverse link transmissions. Each communication link 140 may include one or more carriers, where each carrier may be a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 140 may transmit bidirectional communications and/or unidirectional communications. Communication links 140 may include one or more connections, including but not limited to, 345 MHz, Wi-Fi, BLUETOOTH®, BLUETOOTH® Low Energy, cellular, Z-WAVE®, 802.11, peer-to-peer, LAN, WLAN, Ethernet, fire wire, fiber optic, and/or other connection types related to security and/or automation systems.

The devices 135 and 145 may be dispersed throughout the automation system 100 and each device 135 and 145 may be stationary and/or mobile. Devices 135 and/or 145 may be custom computing entities configured to interact with sensors 110 via network 120, and in some embodiments, via server 115.

In some embodiments, local computing device 145 and remote computing device 135 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smartphone, a mobile phone, a wearable electronic device (e.g., a smartwatch), a personal digital assistant (PDA), a cordless phone, a wireless local loop (WLL) station, a display device (e.g., TVs, computer monitors, etc.), a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a printer, a camera, and/or any other suitable device operable to send and receive signals, store and retrieve data, and/or execute modules.

In one embodiment, device 135 may be considered a remote computing device. The remote computing device 135 may be a computing entity operable to enable a remote user to monitor the output of the sensors 110. The remote computing device 135 may be functionally and/or structurally similar to the local computing device 145 and may be operable to receive data streams from and/or send signals to at least one of the sensors 110 via the network 120. The network 120 may be the Internet, an intranet, a personal area network, a local area network (LAN), a wide area network (WAN), a virtual network, a telecommunications network implemented as a wired network and/or wireless network, etc. The remote computing device 145 may receive and/or send signals over the network 120 via communication links 140 and server 115.

In one embodiment, device 145 may be considered a local computing device. The local computing device 145 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing device 145 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensors 110.

The processor of the local computing device 145 may be operable to control operation of the output of the local computing device 145. The output may be a television, a liquid crystal display (LCD) monitor, a cathode ray tube (CRT) monitor, speaker, tactile output device, and/or the like. In some embodiments, the output may be an integral component of the local computing device 145. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 145 to the output.

While the devices 135 and/or 145 may communicate with each other through the control panel 130 using communication links 140, each device 135 and/or 145 may also communicate directly with one or more other devices via one or more direct communication links 140. Two or more devices 135 and 145 may communicate via a direct communication link 140 when both devices 135 and 145 are in the geographic coverage area or when one or neither of devices 135 or 145 is within the geographic coverage area. Examples of direct communication links 140 may include Wi-Fi Direct, BLUETOOTH®, wired, and/or, and other P2P group connections. The devices 135 and 145 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within automation system 100.

In some embodiments, control panel 130 and/or devices 135 and 145 may include one or more antennas for employing antenna diversity schemes to improve communication quality and reliability between control panel 130 and devices 135 and 145. Additionally or alternatively, control panel 130 and/or devices 135 and 145 may employ multiple-input, multiple-output (MIMO) techniques that may take advantage of multi-path, mesh-type environments to transmit multiple spatial layers carrying the same or different coded data.

In some embodiments, the one or more sensors 110 may be sensors configured to conduct periodic or ongoing automatic measurements related to irrigation parameters. Each sensor 110 may be capable of sensing multiple irrigation parameters, or alternatively, separate sensors 110 may monitor separate irrigation parameters. For example, sensor 110 may measure parameters related to weather, such as humidity, temperature, and wind speed while another sensor 110 (or, in some embodiments, the same sensor 110) may detect conditions related to the soil such as the type of soil, the current moisture level, and/or the density of the soil. In some embodiments, one or more sensors 110 may additionally monitor alternate parameters associated with an irrigation schedule, such as the presence of people, pets, or livestock at the irrigation location. With regard to the presence of people, the sensors 110 may detect motion, sound, pressure, vibration, temperature changes, change in light, or the sensors 110 may be image or video capturing devices such as a video camera. In alternate embodiments, a user may input irrigation related data directly into local computing device 145 or at remote computing device 135. For example, a user may enter irrigation related data into a dedicated application on his smart phone indicating any of a number of datum including weather, government water requirements or restrictions, a desired irrigation schedule, desired amount of water and/or fertilizer to be dispensed, and/or a personal schedule.

Data gathered by the one or more sensors 110 may be communicated to local computing device 145, which may be a stationary or mobile input/output smart home display. In one embodiment, the local computing device 145 may be a wall-mounted control panel. In another embodiment, the local computing device 145 may be a personal computer. In yet another embodiment, the local computing device 145 may be a portable electronic device such as a smartphone or a tablet. Where local computing device 145 is a portable electronic device, the portable electronic device may have a dedicated application directed to collecting irrigation, weather, and personal data and calculating a resulting irrigation schedule. The local computing device 145 may process the data received from the one or more sensors 110 to obtain data related to weather such as humidity, temperature, wind speed; parameters associated with soil conditions such as the type of soil, the current moisture level, and/or the density of the soil; and may process data related to the presence of people, pets, or livestock at the irrigation location such as by obtaining data related to motion, sound, pressure, vibration, temperature changes, change in light, image-capturing, and/or video-capturing.

In alternate embodiments, remote computing device 135 may process the data received from the one or more sensors 110, via network 120 and server 115, to obtain data related to weather such as humidity, temperature, wind speed; parameters associated with soil conditions such as the type of soil, the current moisture level, and/or the density of the soil; and may process data related to the presence of people, pets, or livestock at the irrigation location such as by obtaining data related to motion, sound, pressure, vibration, temperature changes, change in light, image-capturing, and/or video-capturing. Data transmission may occur via, for example, frequencies appropriate for a personal area network (such as BLUETOOTH® or IR communications) or local or wide area network frequencies such as radio frequencies specified by the IEEE 802.15.4 standard.

In some embodiments, local computing device 145 may communicate with remote computing device 135 or control panel 130 via network 120 and server 115. Examples of networks 120 include cloud networks, local area networks (LAN), wide area networks (WAN), virtual private networks (VPN), wireless networks (using 802.11, for example), and/or cellular networks (using 3G and/or LTE, for example), etc. In some configurations, the network 120 may include the Internet. In some embodiments, a user may access the functions of local computing device 145 from remote computing device 135. For example, in some embodiments, remote computing device 135 may include a mobile application that interfaces with one or more functions of local computing device 145.

The server 115 may be configured to communicate with the sensors 110, the local computing device 145 the remote computing device 140 and control panel 130. The server 115 may perform additional processing on signals received from the sensors 110 or local computing device 145 or may simply forward the received information to the remote computing device 135 and control panel 130.

Server 115 may be a computing device operable to receive data streams (e.g., from sensors 110 and/or local computing device 145 or remote computing device 135), store and/or process data, and/or transmit data and/or data summaries (e.g., to remote computing device 135). For example, server 115 may receive a stream of weather data from a sensor 110, a stream of soil-related data from the same or a different sensor 110, and a stream of personal (e.g., presence at a location, etc.) data from either the same or yet another sensor 110. In some embodiments, server 115 may "pull" the data streams, e.g., by querying the sensors 110, the local computing device 145, and/or the control panel 130. In some embodiments, the data streams may be "pushed" from the sensors 110 and/or the local computing devices 145 to the server 115. For example, the sensors 110 and/or the local computing device 145 may be configured to transmit data as it is generated by or entered into that device. In some instances, the sensors 110 and/or the local computing device 145 may periodically transmit data (e.g., as a block of data or as one or more data points).

The server 115 may include a database (e.g., in memory) containing weather data, soil-related data, and personal data received from the sensors 110 and/or the local computing device 145. Additionally, as described in further detail herein, software (e.g., stored in memory) may be executed on a processor of the server 115. Such software (executed on the processor) may be operable to cause the server 115 to monitor, process, summarize, present, and/or send a signal associated with resource usage data.

Figure 2:
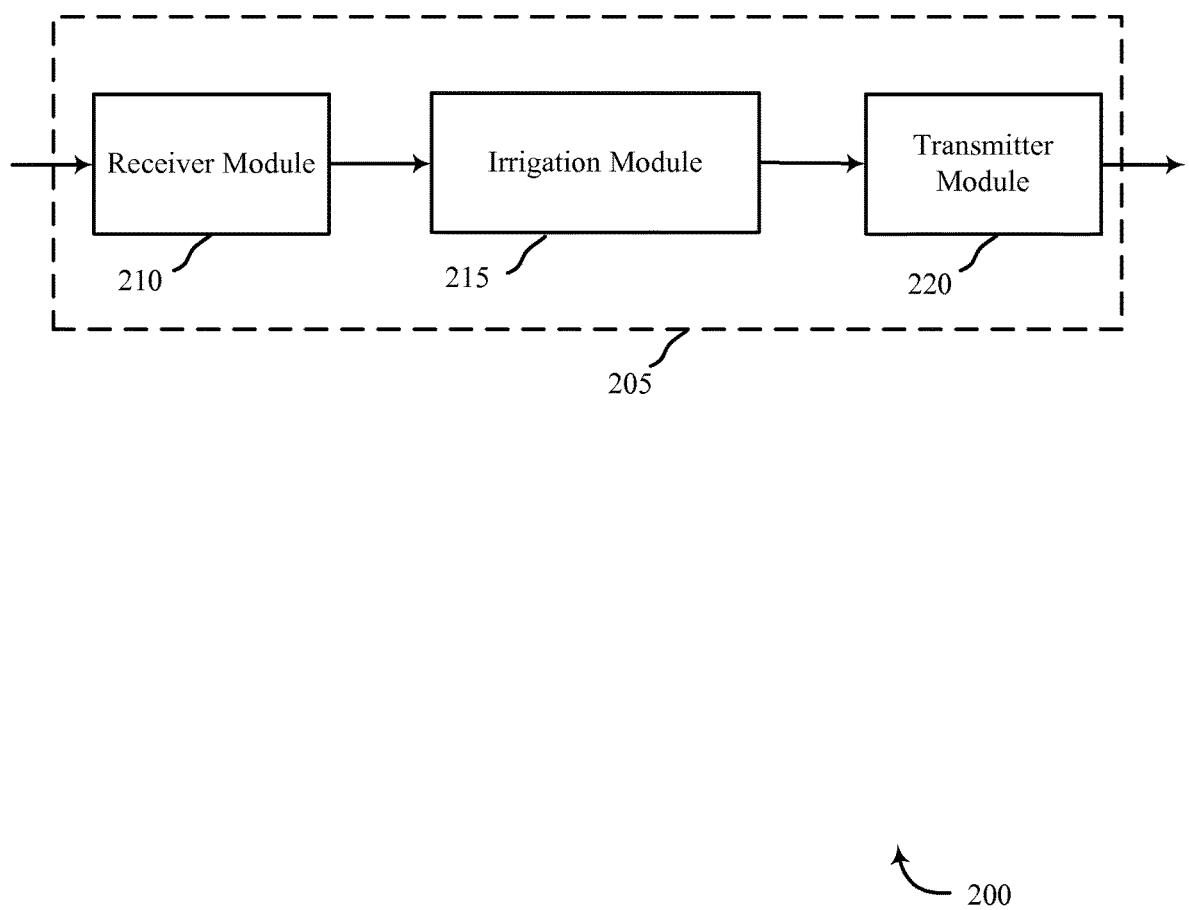
FIG. 2 shows a block diagram of a device relating to managing an irrigation system, in accordance with various aspects of this disclosure.

FIG. 2 shows a block diagram 200 of a control panel 205 for use in managing irrigation systems, in accordance with various aspects of this disclosure. The control panel 205 may be an example of one or more aspects of a control panel 130, or in other embodiments may be an example of one or more aspects of the one or more sensors 110, or in still other embodiments may be an example of one or more aspects of the local computing device 145, each of which are described with reference to FIG. 1. In one embodiment, the control panel 205 may include a receiver module 210, an irrigation module 215, and/or a transmitter module 220. Each of these modules described in FIG. 2 may be in communication with each other directly and/or indirectly.

The components of the control panel 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, user data, and/or control information associated with various information channels (e.g., control channels, data channels, etc.). The receiver module 210 may be configured to receive current weather data, weather forecast data, soil-related data as described previously, and data related to the current and future location of people and/or pets in an irrigated area. Information may be passed on to the irrigation module 215, as well as to other components of the control panel 205.

In one embodiment, irrigation module determines a plurality of data related to the location of an irrigation system. In some examples, the irrigation modules 215 receives information from sensors 110. In other examples, the irrigation module 215 may be able to determine location data itself. In yet other examples, a user may manually input location data into the system such that it can be received directly by the irrigation module.

In some embodiments, location data may be related to information about the soil and land at the location, weather information, or information related to activity at the location. Based on receiving location data, the irrigation module may analyze the data and make a determination as to when irrigation will commence and for how long. In some embodiments, the irrigation module may determine someone or something is located at and/or moving at the location, and may suspend commencing a pre-scheduled irrigation as a result. The irrigation module may pass the determined information onto the irrigation system by way of wired or wireless communications.

The transmitter module 220 may transmit the one or more signals received from other components of the control panel 205. The transmitter module 220 may transmit irrigation information an irrigation system (e.g., a sprinkler system). For example, based on the data received from the sensors, and then analyzed by one or more of the computer systems, a determination of when to irrigate and how much irrigation product should be provided at specific times may be transmitted to the irrigation system. In some examples, the transmitter module 220 may be collocated with the receiver module 210 in a transceiver module.

Figure 3:
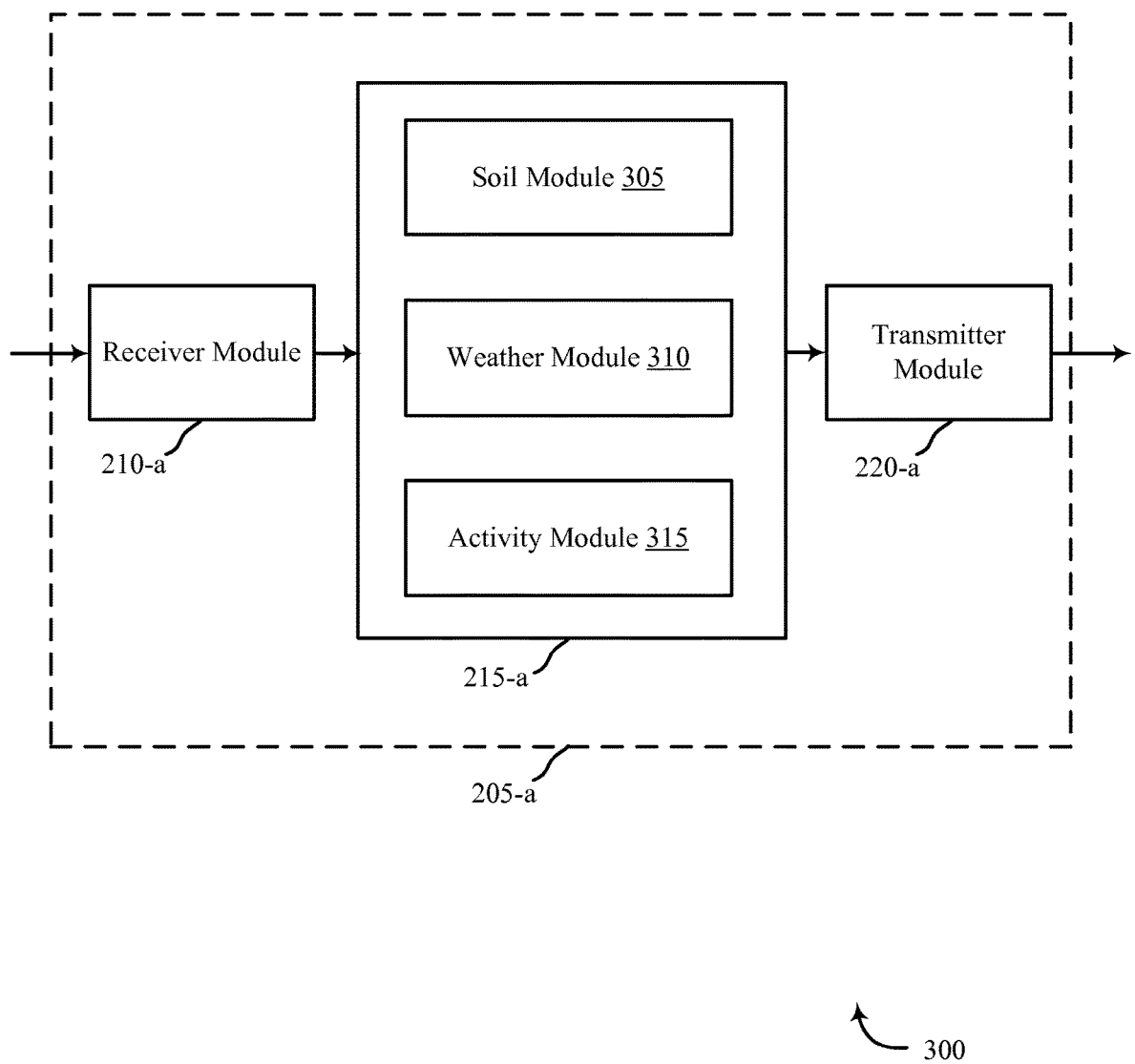
FIG. 3 shows a block diagram of a device relating to managing an irrigation system, in accordance with various aspects of this disclosure.

FIG. 3 shows a block diagram 300 of a control panel 205-a for use in managing irrigation systems, in accordance with various aspects of this disclosure. The control panel 205-a may be an example of one or more aspects of a control panel 205 described with reference to FIG. 2. The control panel 205-a may include a receiver module 210-a, an irrigation module 215-a, and/or a transmitter module 220-a which may correspond to receiver module 210, irrigation module 215, and/or transmitter module 220 described with reference to FIG. 2, respectively. The control panel 205-a may also be, or include, a processor (not specifically shown in FIG. 3).

The components of the control panel 205-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In some embodiments, irrigation module 215-a may analyze data received from the receiver module regarding parameters used to create, maintain, and enable an irrigation schedule. In one embodiment, irrigation module 215-a may comprise a plurality of other modules; for example: soil module 305, weather module 310, and activity module 315. In some embodiments, an irrigation schedule may be determined and enabled based on data obtained from the soil module 305, weather module 310, and activity module 315.

In one embodiment, the soil module 305 may obtain data from the physical land to be irrigated such as soil type, density of the soil, the slope of the land, and/or composition of the soil. In yet other embodiments, the environment module may obtain information related to the presence of people and/or animals in the yard which may affect the irrigation schedule.

The weather module 310 may obtain information related to weather forecasts and/or current weather. For example, the environment module may obtain current or forecasted data indicative of air temperature, humidity, and/or wind speed. For example, if a yard is to be watered every Tuesday and Thursday, but the environment module determines it will rain on Thursday, the system may put a hold on watering the yard on Thursday. In another example, the environmental module may determine that, based on the soil type/composition and the current moisture level of the soil, that additional watering is not needed on Thursday. In yet another example, a user responsible for programming the irrigation schedule may program the schedule without any knowledge about government watering restrictions; however, the environment module may receive information from a government webpage (e.g., by way of an application programming interface (API)) to alter the planned irrigation schedule to conform to government regulations.

In addition to creating or adjusting an irrigation schedule based on weather and soil data, the irrigation schedule may be altered based on activity module 315 determining the presence of people and/or animals. In one embodiment, the activity module 315 may obtain information from sensors 110, where sensors 110 capture information related to the presence of people and/or animals. For example, sensors 110 may be one of a digital camera, a video camera, a motion sensor, a vibration sensor, and/or a pressure sensor. Activity module 315 may receive information from sensors 110 to determine activity in the yard.

In one embodiment, for example, a user may program the irrigation system to water the lawn every Friday at 8:00 p.m., however one Friday the user is throwing a party in the yard. Before the watering is to being, the activity module 315 may determine (by way of receiving sensor information) that people are present in the yard, and thus should put a hold on the watering. Determining the presence of people may be by way of detecting movement by camera and/or motion sensor, or by determining pressure placed on the soil, or by other means.

Figure 4:
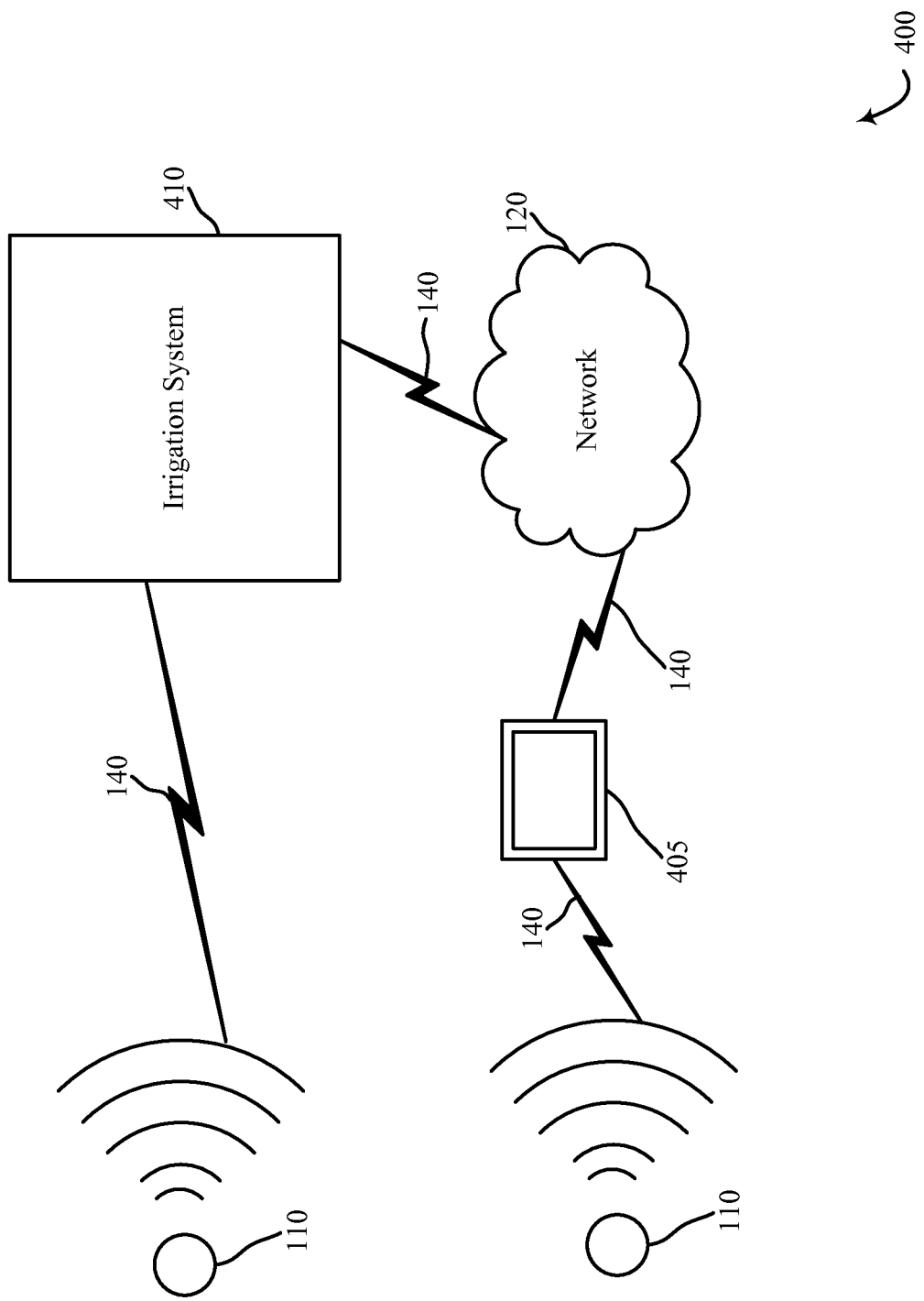
FIG. 4 shows a block diagram of a device relating to managing an irrigation system, in accordance with various aspects of this disclosure.

FIG. 4 is an example of an automation system 400 in accordance with various aspects of the disclosure. Automation system 400 may comprise sensors 110, communication links 140, and network 120, which may be synonymous to the elements previously presented with respect to FIG. 1. In addition, automation system 400 may also comprise a control panel 405 which may be synonymous to control panels 130, 205, and 205-a as previously presented with respect to FIGS. 1-3, respectively.

In FIG. 4, an irrigation system 410 may be communicatively coupled to sensors 110 and/or the network 120 by way of communication links 140. Irrigation system 410 may be a sprinkler system, an irrigation canal, a drip line, or any other suitable irrigation technology. As discussed with respect to FIG. 3, data related to the soil, weather, and activity at the location may be determined by sensors 110. In some embodiments, the sensors 110 provide this data directly to the irrigation system 410. In turn, the irrigation system is enabled to alter the irrigation schedule based on the data received. In other embodiments, the irrigation system 410 receives soil, weather, and activity data from the control panel 405 by way of the network 120. In some embodiments, and as previous discussed, data from the sensors may be automatically gathered and sent to the control panel, where the control panel then analyzes the data and sends the data to the irrigation system. In other embodiments, the irrigation system 410 may receive irrigation schedule from a user interacting directly with the control panel 405 (e.g., manually turning off the irrigation system for an upcoming vacation, manually turning off the system for an outdoor party, manually turning on the system for extra irrigation).

Figure 5:
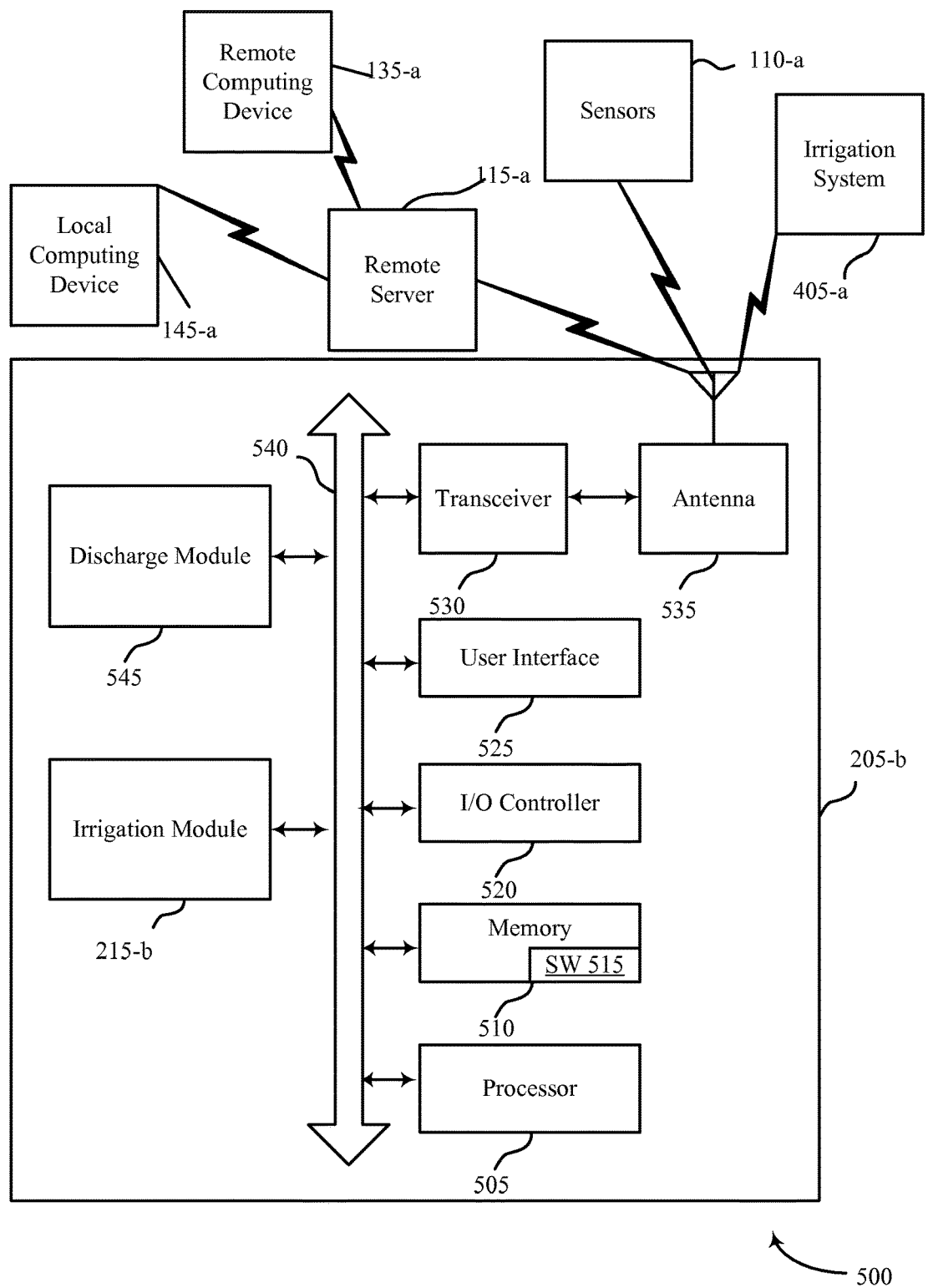
FIG. 5 shows a block diagram of a device relating to managing an irrigation system, in accordance with various aspects of this disclosure.

FIG. 5 shows a system 500 for use in irrigation systems, in accordance with various examples. System 500 may include a control panel 205-b, which may be an example of the control panels 130, 205, 205-a, and/or 405 of FIGS. 1-4, respectively. Control panel 205-b may include irrigation module 215-b, which may be an example of irrigation module 215 described with reference to FIG. 2. In some embodiments, the terms a control panel and a control device are used synonymously.

Control panel 205-b may also include components for bi-directional voice and data communications including components for transmitting communications and components for receiving communications. For example, control panel 205-b may communicate bi-directionally with one or more of server 115-a (and thus with remote computing device 135-a and/or local computing device 145-a), sensors 110-a and/or irrigation system 410-a. This bi-directional communication may be direct or indirect.

The irrigation module 215-b may obtain information related to environment to be irrigated, other external data factors (e.g., current and forecasted weather, government and/or covenant restrictions, user-preferences, etc.) as well as data related to determining the presence of people and/or animals located in the desired irrigation area as described above with reference to FIGS. 1-4.

Control panel 205-b may also include discharge module 545. Discharge module 545 may obtain data related to when the irrigation system should start irrigation and/or end irrigation. In addition, the discharge module may obtain data related to how much liquid should be discharged and where specifically the liquid should be discharged. In some embodiments, the timing and amount of the liquid discharge may depend on information obtained from the irrigation module 215-b.

Control panel 205-b may also include a processor 505, and memory 510 (including software/firmware code (SW) 515), an input/output controller (I/O) 520, a user interface 525, a transceiver 530, and one or more antennas 535 each of which may communicate—directly or indirectly—with one another (e.g., via one or more buses 540). The transceiver 530 may communicate bi-directionally—via the one or more antennas 535, wired links, and/or wireless links—with one or more networks or remote devices as described above. For example, the transceiver 530 may communicate bi-directionally with sensors 110-a, server 115-a and/or irrigation system 410-a. The transceiver 530 may include a modem to modulate the packets and provide the modulated packets to the one or more antennas 535 for transmission, and to demodulate packets received from the one or more antenna 535. While a control panel or a control device (e.g., 205-b) may include a single antenna 535, the control panel or the control device may also have multiple antennas 535 capable of concurrently transmitting or receiving multiple wired and/or wireless transmissions. In some embodiments, one element of control panel 205-b (e.g., one or more antennas 535, transceiver 530, etc.) may provide a direct connection to a server 115-a via a direct network link to the Internet via a POP (point of presence). In some embodiments, one element of control panel 205-b (e.g., one or more antennas 535, transceiver 530, etc.) may provide a connection using wireless techniques, including digital cellular telephone connection, Cellular Digital Packet Data (CDPD) connection, digital satellite data connection, and/or another connection.

The signals associated with system 500 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 535 and/or transceiver module 330 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 535 may receive signals or information specific and/or exclusive to itself. In other embodiments, each antenna 535 may receive signals or information not specific or exclusive to itself.

In some embodiments, one or more sensors 110-a (e.g., moisture, humidity, electrical resistance, dielectric constant, heat, slope, ground pressure, air pressure, sound, vibration, video-capture, motion, etc.) may connect to some element of system 500 via a network using one or more wired and/or wireless connections. In other embodiments, one or more sensors 110-a may be coupled to or be part of irrigation system 410-a. In yet other embodiments, one or more sensors 110-a may be separate from irrigation system 410-a, but may communicate with irrigation system 410-a through wired or wireless communications.

In some embodiments, the user interface 525 may include an audio device, such as an external speaker system, an external display device such as a display screen, and/or an input device (e.g., remote control device interfaced with the user interface 525 directly and/or through I/O controller 520).

One or more buses 540 may allow data communication between one or more elements of control panel 205-b (e.g., processor 505, memory 510, I/O controller 520, user interface 525, etc.).

The memory 510 may include random access memory (RAM), read only memory (ROM), flash RAM, and/or other types. The memory 510 may store computer-readable, computer-executable software/firmware code 515 including instructions that, when executed, cause the processor 505 to perform various functions described in this disclosure (e.g., adjusting the irrigation schedule based on the presence of people in the yard, etc.). Alternatively, the software/firmware code 515 may not be directly executable by the processor 505 but may cause a computer (e.g., when compiled and executed) to perform functions described herein. Alternatively, the computer-readable, computer-executable software/firmware code 515 may not be directly executable by the processor module 505 but may be configured to cause a computer (e.g., when compiled and executed) to perform functions described herein. The processor module 505 may include an intelligent hardware device, e.g., a central processing unit (CPU), a microcontroller, an application-specific integrated circuit (ASIC), etc.

In some embodiments, the memory 510 can contain, among other things, the Basic Input-Output system (BIOS)

which may control basic hardware and/or software operation such as the interaction with peripheral components or devices. For example, the irrigation module 215-b to implement the present systems and methods may be stored within the memory 510. Applications resident with system 500 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver 530, one or more antennas 535, etc.).

Many other devices and/or subsystems may be connected to one or may be included as one or more elements of system 500 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 5 need not be present to practice the present systems and methods. The devices and subsystems can be interconnected in different ways from that shown in FIG. 5. In some embodiments, an aspect of some operation of a system, such as that shown in FIG. 5, may be readily known in the art and are not discussed in detail in this application. Code to implement the present disclosure can be stored in a non-transitory computer-readable medium such as one or more of memory 510 or other memory. The operating system provided on I/O controller 520 may be iOS®, ANDROID®, MS-DOS®, MS-WINDOWS®, OS/2®, UNIX®, LINUX®, or another known operating system.

The transceiver 530 may include a modem configured to modulate the packets and provide the modulated packets to the antennas 535 for transmission and/or to demodulate packets received from the antennas 535. While the control panel or control device (e.g., 205-b) may include a single antenna 535, the control panel or control device (e.g., 205-b) may have multiple antennas 535 capable of concurrently transmitting and/or receiving multiple wireless transmissions.

In one embodiment, the remote computing device 135-a may be a computer system operated by a government agency or other data-providing third-party source. For example, remote computing device 135-a may also provide weather information to system 500 (and thus to irrigation system collected from a third-party source (e.g., the National Oceanic and Atmospheric Administration) or water restriction information from a third-part source (e.g., a city or county webpage). In other embodiments, the third-party sources may have an application programming interface (API) which enables server 115-a, irrigation system 410-a, and or system 500 to obtain data by interacting with the API.

In some embodiments, local computing device 145-a may enable a user to program the irrigation system 410-a. For example, irrigation system 350 may be a sprinkler system dispersed through a home yard environment. Irrigation system 410-a may have the capability to communicate with system 500, remote computing device 135-a, and/or server 115-a. In one embodiment, the user may pre-program the irrigation system 350 to automatically turn on and water the lawn starting at a predetermined time and continuing for a predetermined length of time. In another embodiment, the sprinkler system may be preprogrammed to dispense a predetermined amount of liquid and will automatically stop upon reaching the threshold amount.

As previously discussed, the user may preprogram the irrigation system to water the lawn at specific times and days, but instruct the irrigation system to alter the schedule and amount of liquid dispensed based on obtaining other data; for example, data related to weather or presence of people. Thus, in one example, the user may preprogram the irrigation system to water every other day starting at sunset. The time of sunset may be obtained by querying a third-party remote computer system which maintains the time of sunset in memory. In addition, the irrigation system may be preprogrammed to know a certain type of grass is planted and the type of grass requires a specific moisture level to thrive. Moreover, the government may have recently passed an ordinance which limits the amount of water dispensed per household to a specific amount per week. Based on this data, the irrigation system may override the user's preprogrammed parameters and make a determination on when and how much to water the yard.

The irrigation system may make this determination and pass the information to local computing device 145-a so that the user may monitor the irrigation of the yard. However, in one example embodiment, the user may not have monitored the changes to the system and plans to have a party during a time the irrigation system 410-a has altered the schedule to water the lawn. Thus, the irrigation system 410-a may additionally receive information regarding the presence of people in the yard at the time the watering is to begin, and thus may place a hold on irrigation until another time.

Figure 6:
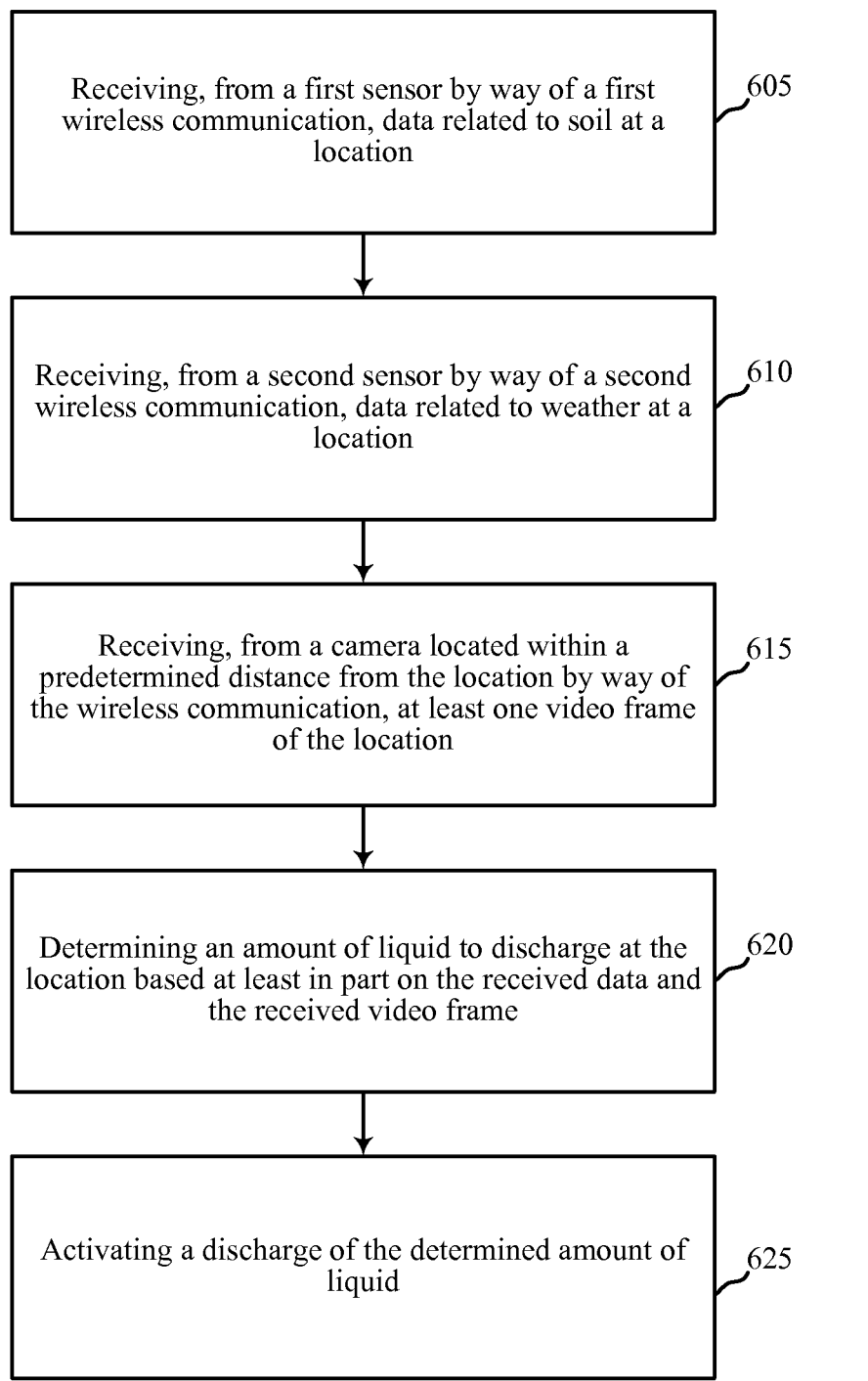
FIG. 6 shows a flow chart illustrating an example of a method relating to managing an irrigation system, in accordance with various aspects of this disclosure.

FIG. 6 is a flow chart illustrating an example of a method 600 for managing an irrigation schedule, in accordance with various aspects of the present disclosure. For clarity, the method 600 is described below with reference to aspects of one or more of the modules, aspects, and elements described with reference to FIGS. 1-5. In some examples, a control panel and/or sensor and/or irrigation system may execute one or more sets of codes to control the functional elements of the control panel and/or sensor and/or irrigation system to perform the functions described below. Additionally or alternatively, the control panel and/or sensor and/or irrigation system may perform one or more of the functions described below using special-purpose hardware.

At block 605, the method 600 may include receiving, from a first sensor by way of a wireless communication, data related to soil at a location. The operation(s) at block 605 may be performed using the irrigation module 215-a and more specifically, the soil module 305 described with reference to FIG. 3.

At block 610, the method 600 may include receiving, from a second sensor by way of a second wireless communication, data related to weather at the location. The operation(s) at block 610 may be performed using the irrigation module 215-a, and more specifically, the weather module 310 described with reference to FIG. 2.

At block 615, the method 600 may include receiving, from a camera located within a predetermined distance from the location by way of a third wireless communication, at least one video frame of the location. The operation(s) at block 615 may be performed using the irrigation module 215-a, and more specifically, the activity module 315 described with reference to FIG. 2.

At block 620, the method 600 may include determining an amount of liquid to discharge at the location based at least in part on the received data and the received video frame. The operation(s) at block 620 may be performed using the irrigation module 215-a, and more specifically, the soil module 305 described with reference to FIG. 2.

At block 625, the method 600 may include activating a discharge of the determined amount of liquid at the location. The operation(s) at block 625 may be performed using the irrigation module 215-*a* (and/or 215-*b*) and/or the discharge module 545 described with reference to FIGS. 2 and 5, respectively.

Thus, the method 600 may provide for an automated irrigation system. It should be noted that the method 600 is just one implementation and that the operations of the method 600 may be rearranged or otherwise modified such that other implementations are possible.

Figure 7:
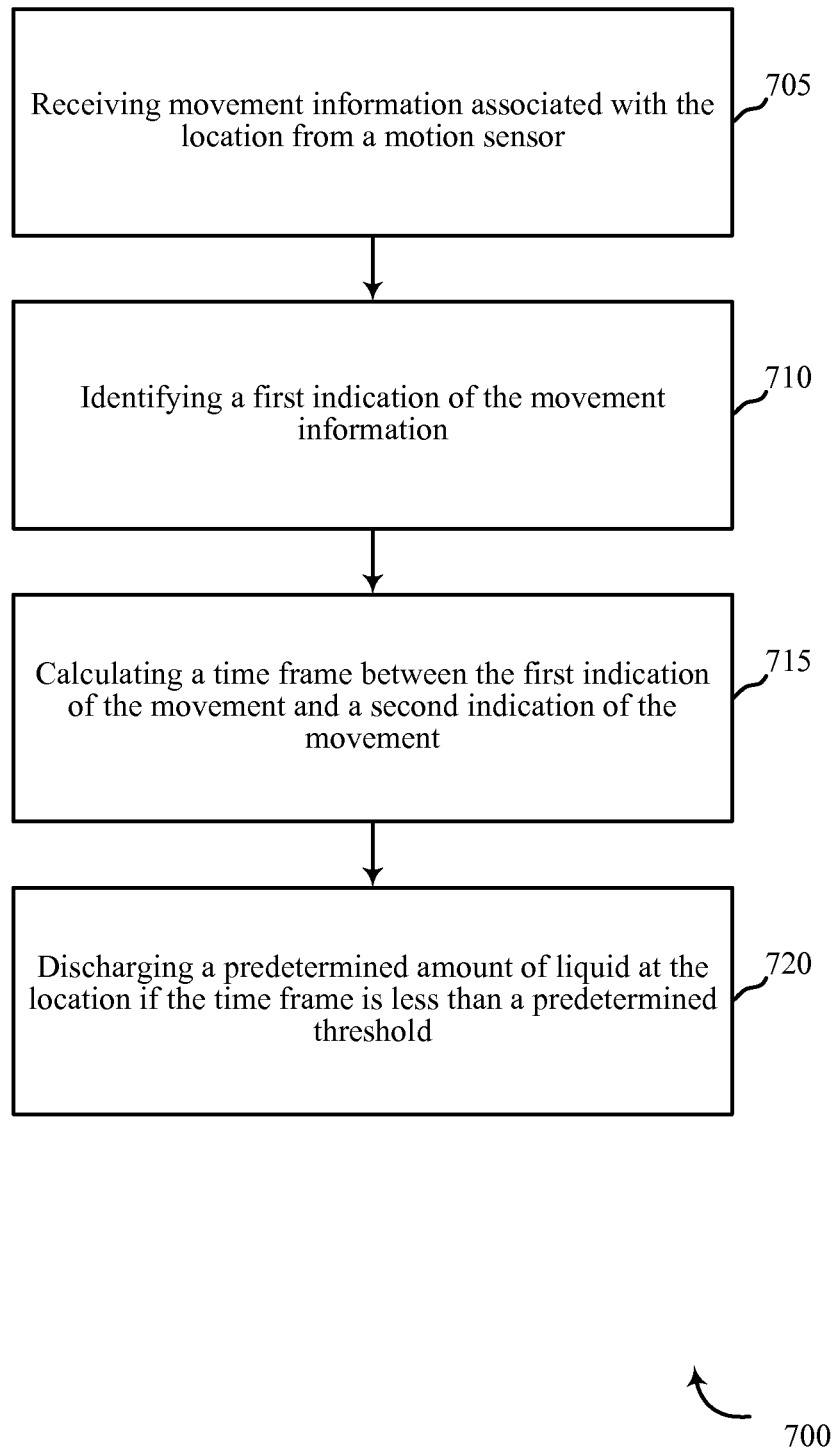
FIG. 7 shows a flow chart illustrating an example of a method to managing an irrigation system, in accordance with various aspects of this disclosure.

FIG. 7 is a flow chart illustrating an example of a method 700 for managing an irrigation schedule, in accordance with various aspects of the present disclosure. For clarity, the method 700 is described below with reference to aspects of one or more of the modules, aspects, and elements described with reference to FIGS. 1-6. In some examples, a control panel and/or sensor and/or irrigation system may execute one or more sets of codes to control the functional elements of the control panel and/or sensor and/or irrigation system to perform the functions described below. Additionally or alternatively, the control panel and/or sensor and/or irrigation system may perform one or more of the functions described below using special-purpose hardware.

At block 705, the method 700 may include receiving movement information associated with a location from a motion sensor. The operation(s) at block 705 may be performed using the activity module 315 described with reference to FIG. 3. For example, movement information may be a motion sensor capturing a person entering the yard.

At block 710, the method 700 may include identifying a first indication of the movement information. The operation(s) at block 710 may be performed using the activity module 315 described with references to FIG. 3. For example, the system may identify a time identifier when the movement has begun.

At block 715, the method 700 may include calculating a time frame between the first indication of the movement and a second indication of the movement. The operation(s) at block 710 may be performed using the activity module 315 described with references to FIG. 3.

At block 720, the method 700 may include discharging a predetermined amount of liquid at the location if the time frame is less than a predetermined threshold. The operation(s) at block 710 may be performed using the activity module 315 described with references to FIG. 3. For example, a person walking through the yard triggers a motion sensor. The system receives movement information (i.e., receiving information there is movement in the yard), as described with reference to block 705. At block 710, the start time of the movement is identified. At block 715, the end time of the movement is identified. If the amount of time movement in the yard is detected is less than a pre-determined threshold (e.g., less than 2 minutes indicating a person is merely passing through the yard as opposed to staying). If the person is only passing through the yard, the system starts the irrigation system and the system begins watering the yard. If the person stays in the yard longer than the pre-determined threshold (e.g., is playing in the yard, is having a party, is sitting on the patio) then the system may hold off on beginning the irrigation.

Thus, the method 700 may provide for an automated irrigation system. It should be noted that the method 700 is just one implementation and that the operations of the method 700 may be rearranged or otherwise modified such that other implementations are possible. In some embodiments, method 700 may be combined with method 600 described with reference to FIG. 6.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to automation system application and irrigation applications, and more specifically with regard to example home environments. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for managing an irrigation schedule, comprising:
   receiving, from a first sensor, data related to soil at a location;
   receiving, from a third party source, data associated with at least one of a government requirement and a covenant associated with the location, wherein the data is received from a remote computing device;
   determining an amount of liquid to discharge at the location based at least in part on the received data;
   receiving movement information associated with the location from a motion sensor;
   identifying a first indication of movement from the movement information;
   calculating a time frame between the first indication of movement and a second indication of movement; and
   if the time frame is less than a predetermined threshold, activating a discharge of the determined amount of liquid at the location.

2. The method of claim 1, further comprising:
   receiving, from a camera, at least one real-time video frame of the location.

3. The method of claim 1, further comprising:
   receiving, from a camera, at least one video frame of the location; and
   storing the at least one video frame received from the camera on a storage device.

4. The method of claim 1, further comprising:
   receiving an indication of irrigation schedule from a user based on the received data, the indication received prior to determining the amount of liquid to discharge.

5. The method of claim 1, wherein determining the amount of liquid to discharge further comprises:
   receiving an indication of a user-selected amount of liquid.

6. The method of claim 1, further comprising:
   obtaining, by way of a wireless communication network, weather data associated with the location.

7. The method of claim 1, wherein receiving the data further comprises receiving on a remote portable electronic device.

8. The method of claim 1, wherein receiving data related to soil at the location further comprises:
   receiving at least one selected from a group comprising: soil moisture; soil type; soil composition; incline of the soil at the location; air humidity at the location; air temperature at the location; and soil temperature at the location.

9. The method of claim 1, further comprising:
receiving, from a second sensor, data related to weather at the location.

10. The method of claim 1, further comprising:
receiving, from a camera located within a predetermined distance from the location, at least one video frame of the location; and
determining, based at least in part on the at least one video frame, a presence of a person, a pet, or livestock, or a combination thereof at the location, wherein determining the amount of liquid to discharge is based at least in part on the determined presence.

11. An apparatus for managing an irrigation schedule comprising:
a processor;
a memory in electronic communication with the processor;
instructions stored in the memory, the instructions being executable by the processor to:
receive, from a sensor, data related to soil at a location;
receive, from a third party source, data associated with at least one of a government requirement and a covenant associated with the location, wherein the data is received from a remote computing device;
determine an amount of liquid to discharge at the location based at least in part on the received data;
receive movement information associated with the location from a motion sensor;
identify a first indication of movement from the movement information;
calculate a time frame between the first indication of movement and a second indication of movement; and
if the time frame is less than a predetermined threshold, activate a discharge of the determined amount of liquid at the location.

12. The apparatus of claim 11, wherein the instructions further cause the processor to receive, from a camera, at least one real-time video frame of the location.

13. The apparatus of claim 11 further comprising:
a storage device coupled to the processor;
wherein the instructions further cause the processor to;
receive, from a camera, at least one video frame; and
store on the storage device the at least one video frame received from the camera.

14. The apparatus of claim 11 wherein the instructions further cause the processor to receive an indication of irrigation schedule from a user, the irrigation schedule based on the received data, the indication received prior to determining the amount of liquid to discharge.

15. The apparatus of claim 11 wherein when the processor determines the amount of liquid to discharge, the instructions further cause the processor to receive an indication of a user-selected amount of liquid.

16. The apparatus of claim 11 wherein the instructions further cause the processor to obtain, by way of a wireless communication network, weather data associated with the location.

17. The apparatus of claim 11 wherein when the processor receives the data and the video frame, the instructions further cause the processor to receive the data on a remote portable electronic device.

18. A non-transitory computer-readable medium storing computer-executable code, the code executable by a processor to:
receive, from a sensor data related to soil at a location;
receive, from a third party source, data associated with at least one of a government requirement and a covenant associated with the location, wherein the data is received from a remote computing device;
determine an amount of liquid to discharge at the location based at least in part on the received data;
receive movement information associated with the location from a motion sensor;
identify a first indication of movement from the movement information;
calculate a time frame between the first indication of movement and a second indication of movement; and
if the time frame is less than a predetermined threshold, activate a discharge of the determined amount of liquid at the location.

* * * * *